United States Patent
Amirparviz et al.

(10) Patent No.: US 8,848,289 B2
(45) Date of Patent: Sep. 30, 2014

(54) NEAR-TO-EYE DISPLAY WITH DIFFRACTIVE LENS

(75) Inventors: Babak Amirparviz, Mountain View, CA (US); Chia-Jean Wang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 386 days.

(21) Appl. No.: 13/421,496

(22) Filed: Mar. 15, 2012

(65) Prior Publication Data

US 2013/0242392 A1    Sep. 19, 2013

(51) Int. Cl.
G02B 27/28    (2006.01)

(52) U.S. Cl.
USPC ....... 359/485.05; 359/630; 359/633; 359/637

(58) Field of Classification Search
CPC ............. G02B 27/0172; G02B 27/283; G02B 27/126; G02B 27/144
USPC .............................. 359/485.05, 630, 633, 637
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,699,194 A * | 12/1997 | Takahashi | 359/633 |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |

(Continued)

FOREIGN PATENT DOCUMENTS

| GB | 2272980 A | 6/1994 |
|---|---|---|
| KR | 10-2009-0053316 A | 5/2009 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Frank Font
(74) *Attorney, Agent, or Firm* — Blakely Sokoloff Taylor & Zafman LLP

(57) ABSTRACT

An eyepiece for a HMD includes a waveguide, an ambient light polarizer, and a wire grid polarizer with a diffraction lens having a lens function patterned into the wire grid polarizer. Polarized image light is guided between eye-ward and ambient sides of the waveguide from a display source to a viewing region of the waveguide where the polarized image light is directed out of the waveguide through the eye-ward side. The viewing region passes ambient light incident on the ambient side through to the eye-ward side. The ambient light polarizer is disposed adjacent to the ambient side to polarize the ambient light into polarized ambient light having a second polarization orthogonal to the first polarization. The wire grid polarizer is disposed adjacent to the eye-ward side along the viewing region. The wire grid polarizer is oriented to applying the lens function to the polarized image light via diffraction.

28 Claims, 7 Drawing Sheets

(56) References Cited

U.S. PATENT DOCUMENTS

| | | | |
|---|---|---|---|
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,542,209 B2 * | 6/2009 | McGuire, Jr. ............... 359/630 |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2004/0085292 A1 | 5/2004 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0013185 A1 | 1/2008 | Garoutte et al. |
| 2008/0219025 A1 | 9/2008 | Spitzer et al. |
| 2008/0291120 A1 | 11/2008 | Wu et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0213664 A1 | 9/2011 | Osterhout et al. |
| 2011/0317233 A1 | 12/2011 | Hayashibe et al. |
| 2012/0119978 A1 * | 5/2012 | Border et al. ............... 345/8 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.
PCT/US2013/030021; PCT International Search Report and Written Opinion of the International Searching Authority, mailed Jun. 26, 2013, 9 pages.

* cited by examiner

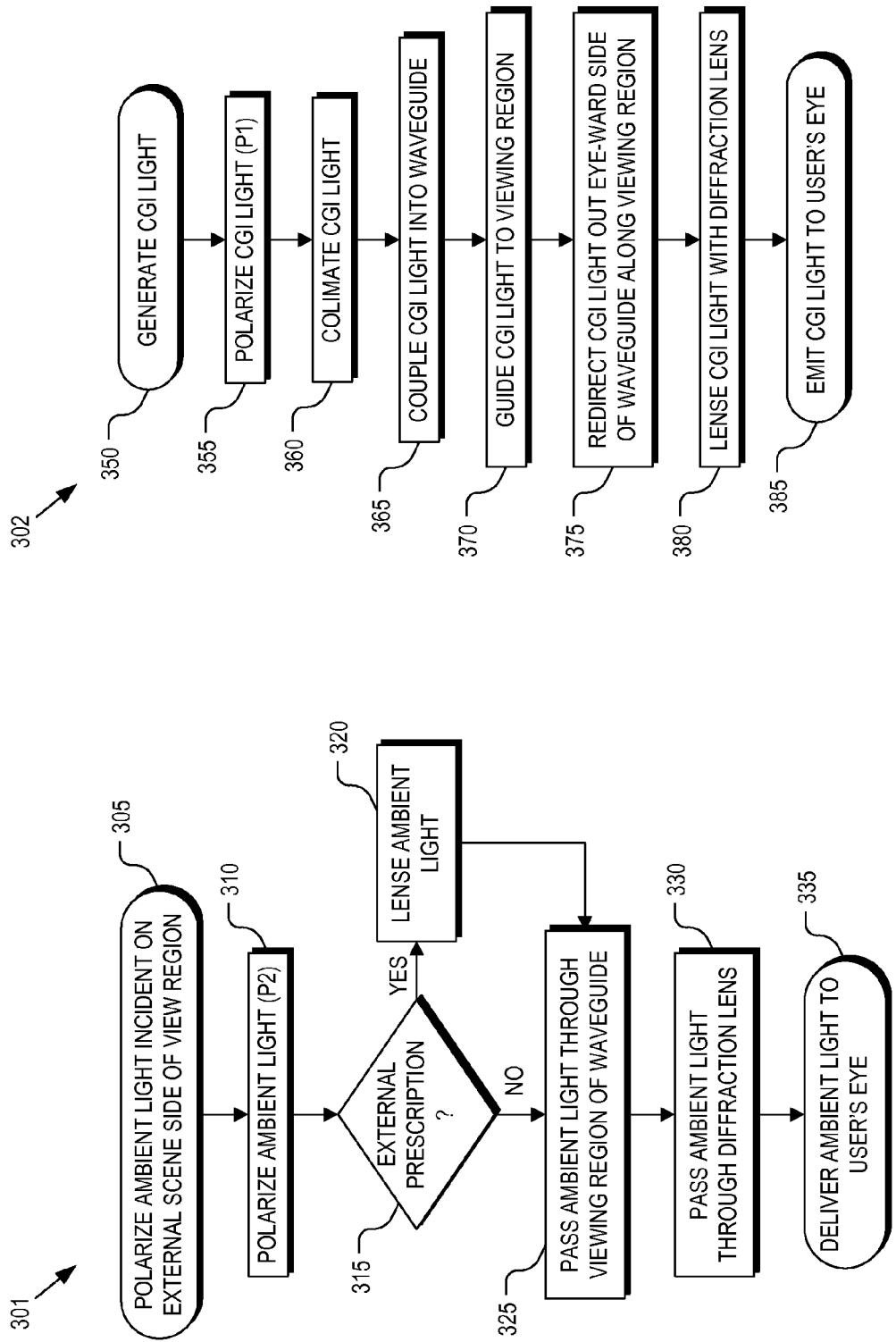

NEAR-TO-EYE DISPLAY WITH DIFFRACTIVE LENS

TECHNICAL FIELD

This disclosure relates generally to optical devices, and in particular but not exclusively, relates to near-to-eye displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI") while blocking the user's external view. These HMD displays are often referred to as virtual reality ("VR") displays. Other HMDs are capable of superimposing CGI over a real-world view. This latter type of HMD can serve as the hardware platform for realizing augmented reality ("AR"). With AR the viewer's image of the world is augmented with an overlaying CGI. Another term used to refer to various types of HMDs is a heads-up display ("HUD"). A HUD is any display that permits the user to view a CGI without having to look down or otherwise taking their eyes significantly off their head up forward position. Both VR and AR HMDs can be implemented as HUDs.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are currently limited due to the cost, size, weight, limited field of view, small eyebox, or poor efficiency of conventional optical systems used to implemented existing HMDs. Another drawback of conventional HMDs is that many are not well suited for individuals that wear prescription glasses.

FIG. 1 illustrates a conventional near-to-eye optical system 100 using a waveguide 105 with internal partially reflecting mirrors 110. In order to produce a useful image at eye 115, each incident angle of input light should correspond to a single output angle of emitted light. Since waveguide 105 guides light 120 from the input side to the output side with multiple internal reflections between the input and output sides, in order to preserve the one-to-one correspondence of input and output angles, this system uses collimated input light 120 of virtual images placed at infinity. For images placed closer than infinity (i.e., less than collimated light), waveguide 105 begins to create ghost images within the eyebox, which reduce the modulation transfer function ("MTF") and image contrast and severely detracts from the user experience.

For most users an image placed at infinity is comfortable and easily focused on. However, for users that are nearsighted, an image placed at infinity is blurry and difficult, if not impossible, to bring into focus without the aid of a prescription lens. Thus, optical system 100 includes a refractive prescription lens 125, which increases the divergence of collimated light 120. The downside of optical system 100 is that refractive prescription lens 125 is often a bulky, heavy element and must be placed between waveguide 105 and eye 115. External placement of waveguide 105 on the outside of refractive prescription lens 125 can result in unusual looking eyewear that many users may be unwilling to wear and requires the same prescription be applied to light 120 as is applied to external ambient light 130.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 3A is a flow chart illustrating a process of operation of the eyepiece to deliver ambient light to a user's eye through the eyepiece, in accordance with an embodiment of the disclosure.

FIG. 3B is a flow chart illustrating a process of operation of the eyepiece to deliver computer generated image ("CGI") light to a user's eye, in accordance with an embodiment of the disclosure.

DETAILED DESCRIPTION

Embodiments of an apparatus, system, and method of operation for an eyepiece with an integrated diffraction lens of a near-to-eye display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
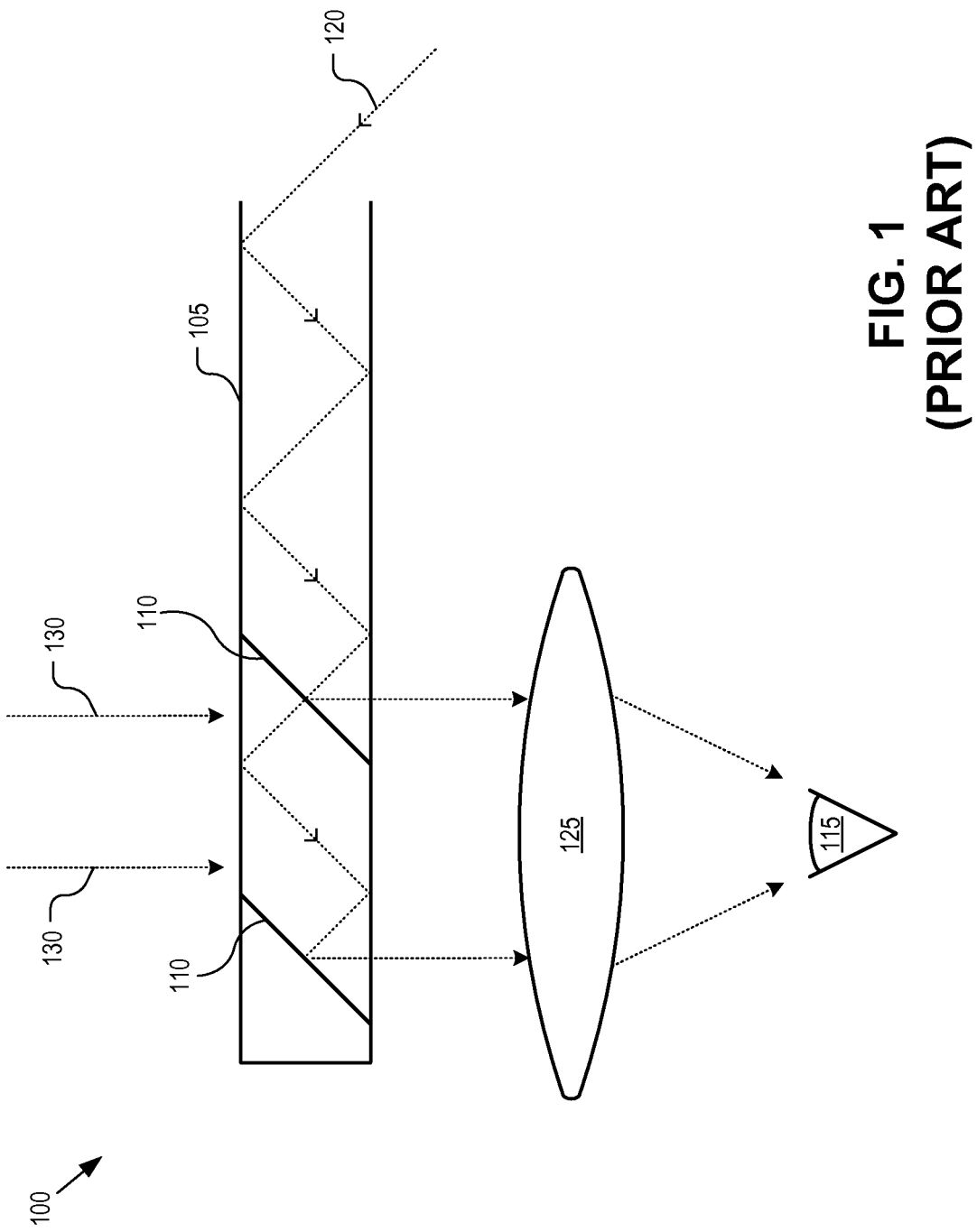
FIG. 1 illustrates a conventional near-to-eye optical system.
Figure 2:
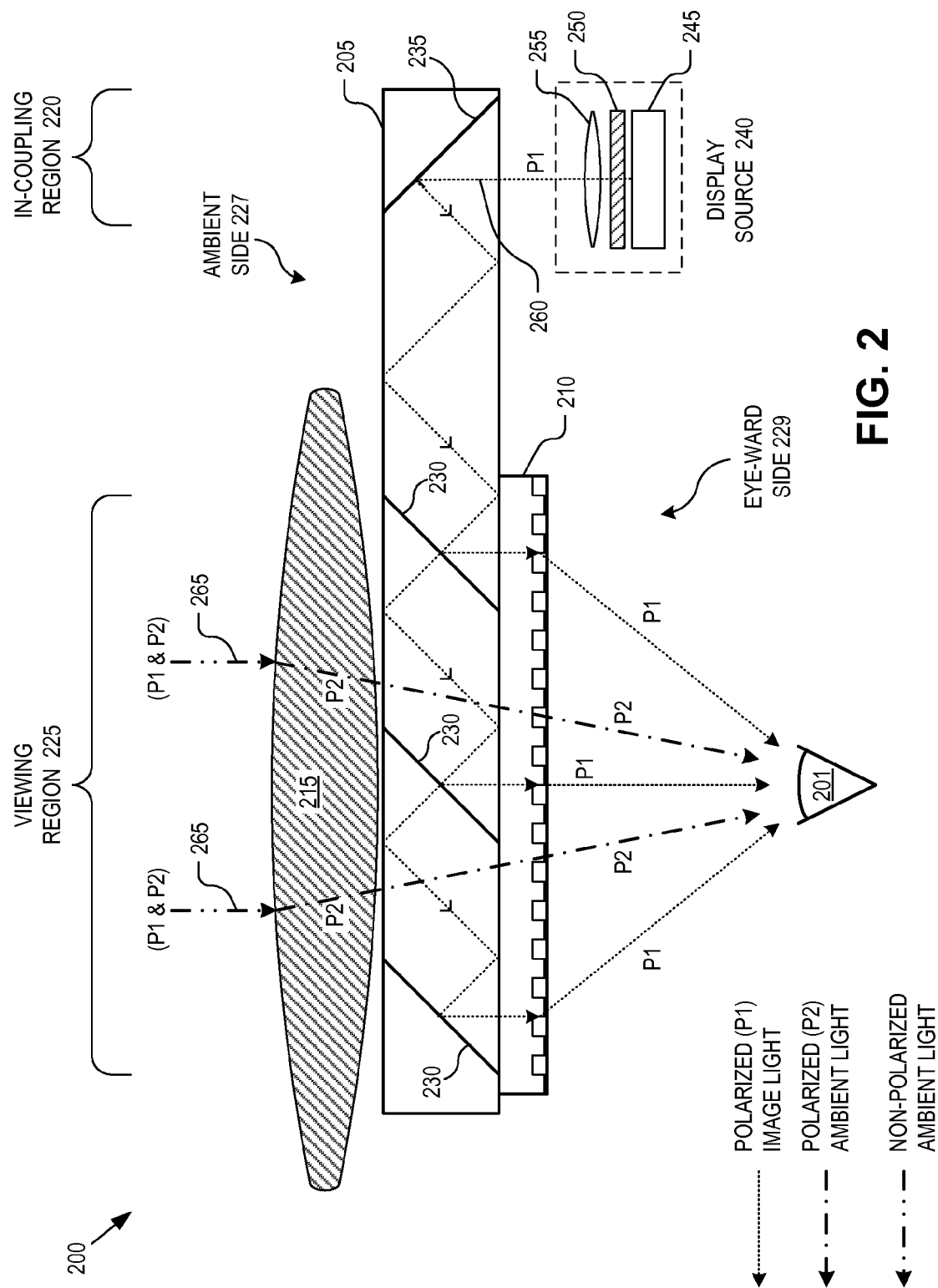
FIG. 2 illustrates an eyepiece for a head mounted display ("HMD") including a diffraction lens, in accordance with an embodiment of the disclosure.

FIG. 2 illustrates an eyepiece 200 for use with a head mounted display ("HMD"), in accordance with an embodiment of the disclosure. The illustrated embodiment of eyepiece 200 includes a waveguide 205, wire grid polarizer ("WGP") 210 having diffractive lens patterned into it, and a polarizer 215. The illustrated embodiment of waveguide 205 includes an in-coupling region 220, a viewing region 225, an ambient side 227 and an eye-ward side 229. The illustrated embodiment of viewing region 225 includes partially reflective surfaces 230. The illustrated embodiment of in-coupling region 220 includes reflective surface 235. When used in connection with a HMD display, eyepiece 200 may be optically coupled with a display source 240. The illustrated embodiment of display source 240 includes a display panel 245, a polarizer 250, and a collimating lens 255.

Display source 240 may be fabricated of discrete or integrated components, such as display panel 245, polarizer 250, and collimating lens 255 to output collimated and polarized image light 260. For example, display panel 245 may be implemented as a backlit liquid crystal display ("LCD"), a front illuminated liquid crystal on silicon ("LCoS") display, a quantum dot array, a micro-mirror display, a pico-projector, an light emitting diode ("LED") array, or otherwise. If display panel 245 includes collimated laser sources, then collimating lens 255 may be omitted. Polarizer 250 may be implemented as an absorptive polarizer or a reflective polarizing beam splitter ("PBS"). Although FIG. 2 illustrates the components of display source 240 as being external to waveguide 205, in some embodiments, one or more components may be embedded within waveguide 205 along the optical path of image light 260.

Waveguide 205 is fabricated of an optical transmissive material for guiding image light 260 from in-coupling region 220 to viewing region 225 between ambient side 227 and eye-ward side 229. In the illustrated embodiment, ambient and eye-ward sides 227 and 229 are substantially parallel to each other. In one embodiment, image light 260 is guided via total internal reflection ("TIR") from in-coupling region 220 to viewing region 225. In other embodiments, portions of the side surfaces of waveguide 205 may be coated with reflective material to aid the light guiding properties of waveguide 205. Waveguide 205 is further optically transmissive to ambient light 265 incident on ambient side 227 within viewing region 225. Ambient light 265 that strikes ambient side 227 sufficiently close to normal, will pass through waveguide 205 to WGP 210. Waveguide 205 may be fabricated of a variety of materials such as glass, quartz, optical grade plastic (e.g., acrylic, poly-methyl-metha-crylate, Zeonex—E48R, etc.), or otherwise.

The illustrated embodiment of waveguide 205 includes a reflective surface 235 disposed at an oblique angle within in-coupling region 220 to couple image light 260 into waveguide 205. Reflective surface 235 may be a PBS (in which case polarizer 250 may be omitted), a mirror surface (e.g., silver surface), a dichroic mirror that reflects light received within a specific angle, or otherwise. Alternatively, in place of reflective surface 235, in-coupling region 220 may include a prism molded into the end or eye-ward side surfaces of waveguide 205 or even an anti-reflective ("AR") coating to couple image light 260 into waveguide 205 at an appropriate angle to promote TIR.

The illustrated embodiment of viewing region 225 includes three partially reflective surfaces 230 disposed at oblique angles (e.g., 45 degrees to the ambient and eye-ward sides). However, in other embodiments, viewing region 225 may include just a single reflective surface, two partially reflective surfaces, or more than three partially reflective surfaces. Partially reflective surfaces 230 may be implemented as non-polarizing beam splitters, PBS, dichroic reflectors, or otherwise. In yet other embodiments, one or both of in-coupling region 220 and viewing region 225 may include one or two dimensional arrays of micro-mirrors (instead of reflective surfaces 230 and 235) disposed along ambient side 227 to perform the in-coupling and out-coupling light bending.

Polarizer 215 is disposed adjacent to ambient side 227 and extends along viewing region 225 to polarize incident ambient light 265. Polarizer 215 may be implemented as a reflective polarizer or an absorptive polarizer and may even be implemented as a WGP. Polarizer 215 operates to polarize the non-polarized ambient light 265 into polarized ambient light 265 having a polarization P2 that is substantially orthogonal to the polarization P1 of image light 260. In one embodiment, P1 and P2 are linearly orthogonal polarizations. In the illustrated embodiment, polarizer 215 is an absorptive polarizer that is shaped into a prescription lens to provide corrective lensing to ambient light 265. In other embodiments, polarizer 215 may be shaped into a blank lens without optical power (e.g., polarized sunglasses) or polarizer 215 may be provided as a distinct element (not illustrated). In the latter embodiment, polarizer 215 may be coated or bonded onto ambient side 227 of waveguide 205 in viewing region 225.

WGP 210 is disposed adjacent to eye-ward side 229 and extends along viewing region 225. WGP 210 includes wires or nano-wires oriented to apply diffractive lensing to polarization P1 while passing polarization P2 substantially without diffractive lensing (see FIGS. 4A and 4B). WGP 210 is patterned into a diffractive lens (see FIGS. 5A and 5B). The nano-wires of WGP 210 may be fabricated of conductive material (e.g., metal lines). These nano-wires may be fabricated on an independent substrate, or directly on eye-ward side 229 itself, and positioned along viewing region 225. The pattern of nano-wires making up WGP 210 may be fabricated using a variety of techniques including imprint lithography or various deposition/lithography/etch and metal liftoff techniques.

FIGS. 3A and 3B are flow charts illustrating the operation of eyepiece 200, in accordance with embodiments of the disclosure. FIG. 3A illustrates a process 301 of how ambient light 265 is delivered to the user's eye 201 through eyepiece 200, while FIG. 3B illustrates a process 302 of how image light 260 is overlaid and delivered to eye 201 via eyepiece 200. The order in which some or all of the process blocks appear in processes 301 and 302 should not be deemed limiting. Rather, one of ordinary skill in the art having the benefit of the present disclosure will understand that some of the process blocks may be executed in a variety of orders not illustrated, or even in parallel.

In a process block 305, non-polarized ambient light 265 is incident on ambient side 227 in viewing region 225 of eyepiece 200. Ambient light 265 is the user's external view of the ambient world beyond eyepiece 200. In process block 310, the incident ambient light 265 is polarized by polarizer 215. In one embodiment, polarizer 215 is coated onto or otherwise included/molded with a prescription lens (decision block 315) and thus lenses ambient light 265 according to a prescription (process block 320). In another embodiment, polarizer 215 is a flat coating or included with a lens blank (decision block 315), which does not lens ambient light 265.

After polarizing ambient light 265, the polarized ambient light 265 is passed through waveguide 205 in viewing region 225 from ambient side 227 to eye-ward side 229 (process block 325). Polarizer 215 is configured to polarize ambient light 265 along a polarization P2 that is orthogonal to a polarization which WGP 210 diffracts. Thus, in a process block 330, polarized ambient light 265 passes through WGP 210 substantially unaffected by the lens function of the diffractive lens patterned into WGP 210. Thus, FIG. 2 illustrates the light path of polarized ambient light 265 being unaffected by WGP 210. Finally, in a process block 335, ambient light 265 is delivered to the user's eye 201.

Turning now to process 302, delivery of CGI light 260 to the user eye 201 via eyepiece 200 is described. In a process block 350, display source 240 generates CGI, which is output as image light or CGI light 260. CGI light 260 is polarized prior to reaching WGP 210 to have a polarization P1 that is orthogonal to the polarization P2 of polarized ambient light 265. In the illustrated embodiment, display source 240 includes a polarizer 250 that is external to waveguide 205; however, in other embodiments polarizer 250 may be included within waveguide 205. For example, reflective surface 235 may be implemented as a PBS that reflects the P1 polarization down waveguide 200 while allowing the P2 polarization to pass straight through and out ambient side 227 of waveguide 200. In this embodiment, reflective surface 235 operates to in-couple CGI light 260 and polarizes the CGI light. In yet other embodiments, polarizer 250 may remain an independent element disposed within waveguide 200.

In a process block 360, CGI light 260 is collimated to preserve the one-to-one correspondence of input angles to output angles. Since waveguide 200 guides CGI light 260 via reflection off the ambient and eye-ward sides, CGI light 260 should be collimated to prevent blurring or ghosting of the output CGI light 260. In the illustrated embodiment, a lens 255 is used to collimate CGI light 255. However, in some embodiments, display panel 245 may include a collimated light source (e.g., laser source), which is already collimated, in which case an independent collimating lens may be omitted. Collimating lens 255 may be a refractive, diffractive, or hybrid type lens.

In process block 365, CGI light 260 is coupled into waveguide 200 via reflective surface 235. Reflective surfaces 235 operates to redirect the angle of CGI light 260, from a near normal incidence to a sufficiently oblique incident such that TIR guides CGI light 260 down waveguide 200 to viewing region 225 (process block 370). In other embodiments, reflective surface 235 may be omitted or replaced with other in-coupling techniques as described above.

In a process block 375, CGI light 260 is redirected out of waveguide 200 along viewing region 225 by partially reflective surfaces 230. In one embodiment, partially reflective surfaces 230 may have a variable reflectivity (e.g., for three reflective surfaces: 33% reflectivity, 50% reflectivity, 100% reflectivity for P1 polarization) and be polarization selective.

The redirected CGI light 260 then passes through WGP 210. The WGP 210 is polarization selective and oriented to diffract the P1 polarization of CGI light 260 (see FIGS. 4A, 4B). As mentioned above, WGP 210 is patterned to include a diffraction lens with optical power that applies a lensing function (see FIGS. 5A, 5B). In the illustrated embodiment, the lensing function increases divergence of CGI light 260 to compensate for near-sightedness. Other types of lensing functions may be implemented. Since the lensing function is diffractive, it is also wavelength dependent. Thus, diffraction lens is designed specifically to operate on the wavelength(s) of CGI light 260. Finally, in a process block 385, the lensed CGI light 260 is provide to eye 201. Since both ambient light 265 and CGI light 260 are delivered to eye 201, the CGI light 260 is said to provide an augmented reality, since it is perceived by the user to augment or overlay the ambient light.

Figure 4A:
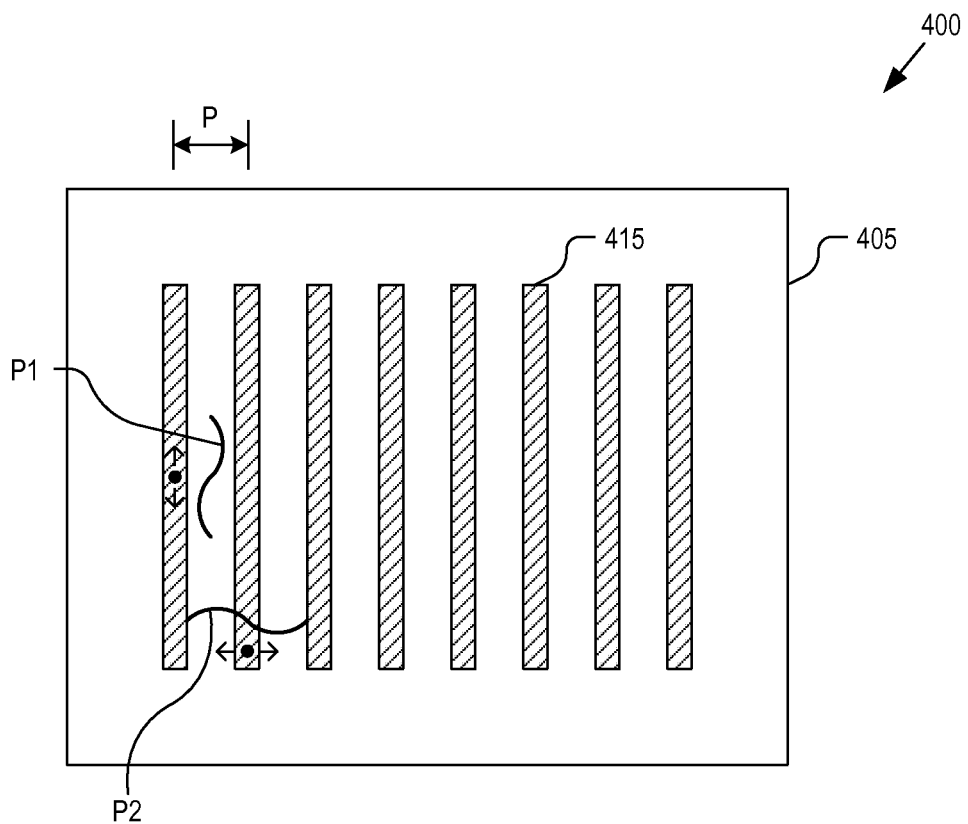
FIG. 4A is a front view of a wire-grid polarizer, in accordance with an embodiment of the disclosure.
Figure 4B:
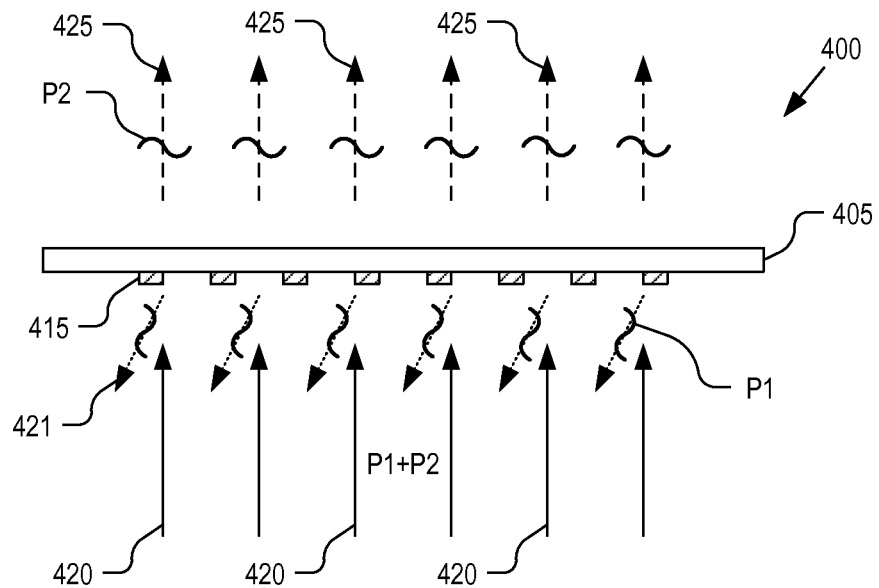
FIG. 4B is a side view of a wire-grid polarizer, in accordance with an embodiment of the disclosure.

FIGS. 4A and 4B illustrates an unpattered WGP 400, in accordance with an embodiment of the disclosure. FIG. 4A is a front view, while FIG. 4B is a side view of the same. WGP 400 illustrates the basic principles behind the polarization selectivity of WGP 210.

WGP 400 includes a plurality of metal lines 415 (or wires) that run substantially parallel to each other. In one embodiment, metal lines 415 are disposed on substrate 405, which may be a clear or transparent substrate. In one embodiment, metal lines 415 may be embedded within substrate 405. Metal lines 415 may be fabricated of aluminum, tin, copper, or other conductive material. Substrate 405 may be fabricated of glass, quartz, acrylic, plastic (e.g., PMMA, Zeonex—E48R, etc.) or other transparent materials. In some embodiments, substrate 405 may include one or more optical filter coatings (e.g., antireflective coatings, color coatings, darkening coatings, or otherwise). Substrate 405 may represent the eye-ward side 229 of waveguide 200 or a substrate that is bonded to eye-ward side 229 of waveguide 200. The pitch P between adjacent metal lines 415 is generally selected to be below the wavelength(s) to be affected. As a mere example, the pitch may be selected to be about 100 nm, while the thickness of metal lines 415 may be selected to be about 30-50 nm. Of course, other pitches and thickness may be selected according to the application, wavelengths, and desired polarization characteristics.

During operation, when WGP 400 is illuminated with light 420 including polarization components 421 having a first linear polarization P1 and components 425 having a second linear polarization P2, components 421 are substantially reflected while components 425 pass through substantially unaffected. The electric field of first linear polarization P1 excites electrons parallel along the length of metal lines 415, which results in components 421 being radiated along a reflection path. In contrast, the electric field of second linear polarization P2 excites electrons laterally across metal lines 415. Since the electrons within metal lines 415 are confined laterally (due to thinness of the nanowires), components 425 pass between metal lines 415 substantially unaffected. Of course, if WGP 400 is illuminated with polarized light having the second linear polarization P2 (e.g., polarized ambient light 265), then the light will substantially pass through unaffected. In contrast, if WGP 400 is illuminated with polarized light having the first linear polarization P1 (e.g., polarized CGI light 260), then the light will substantially reflect.

The degree to which polarized light passes through WGP 400, or is reflected thereby, is a function of at least the wavelength of the incident light and the grid pitch between metal lines 415. Accordingly, different separations pitches can be applied to different portions of WGP 400 (i.e., non-uniform pitch across the wire grid) to spatially vary the spectral response of WGP 400.

Figure 5A:
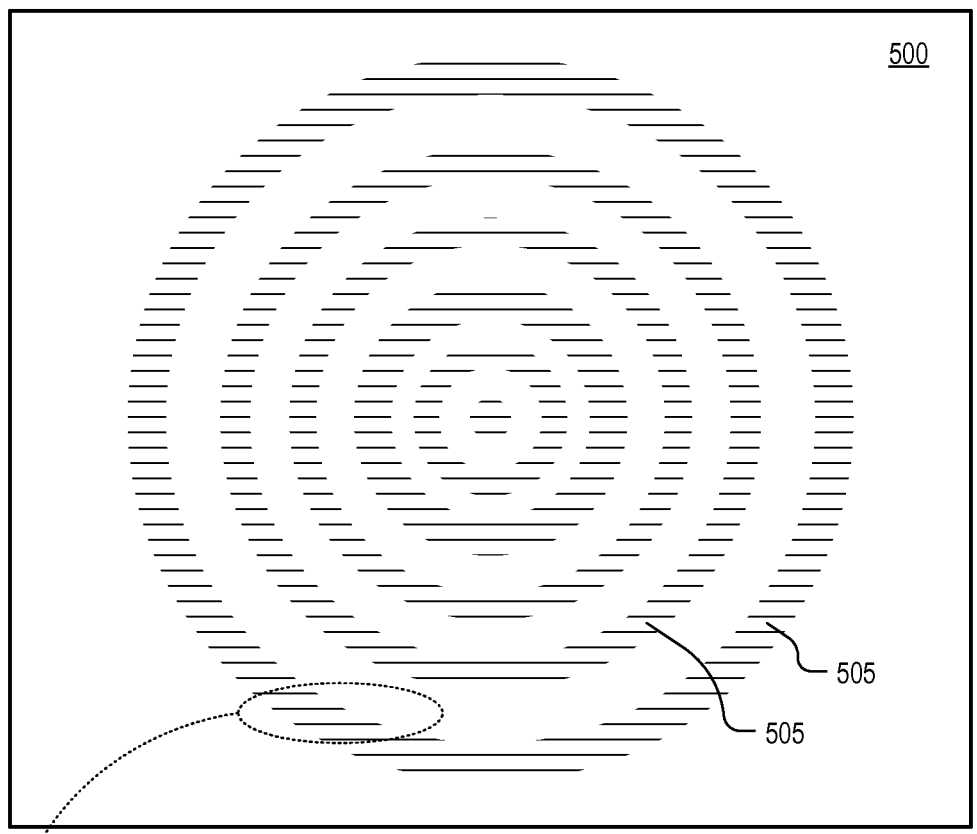
FIG. 5A illustrates an example Fresnel zone diffraction lens patterned into a wire-grid polarizer, in accordance with an embodiment of the disclosure.
Figure 5B:
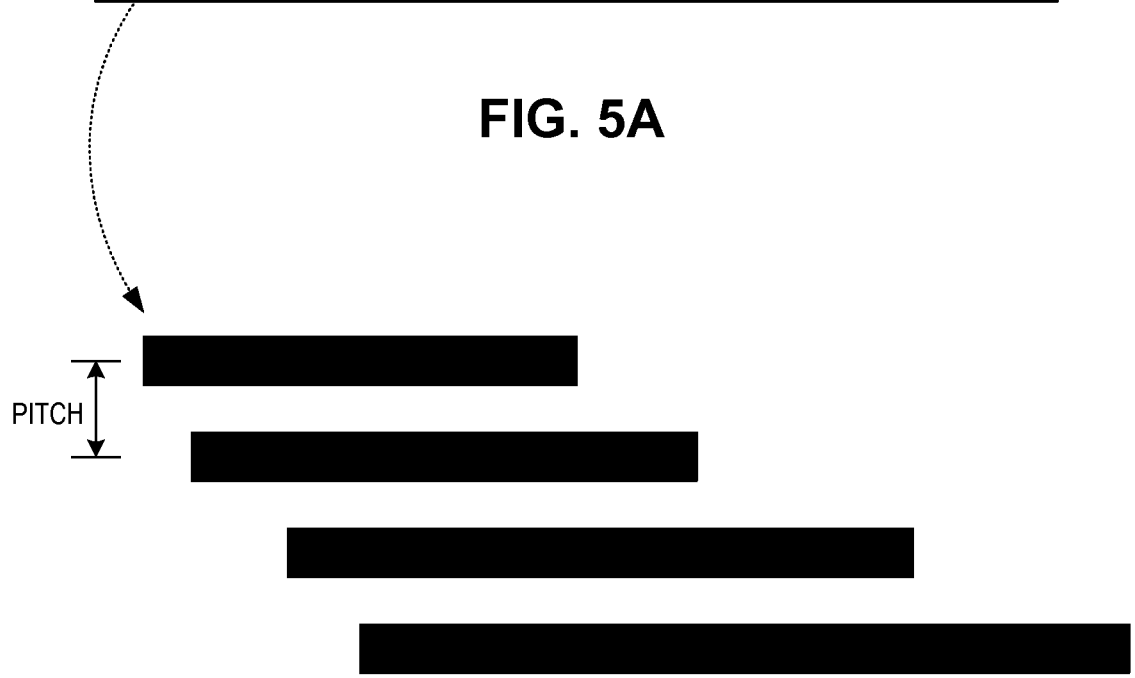
FIG. 5B is an expanded view of a portion of the Fresnel zone diffraction lens having a diverging lens function, in accordance with an embodiment of the disclosure.

FIGS. 5A and 5B illustrate how patterning a wire-grid polarizer with a diffraction lens, such as a Fresnel diffraction lens pattern, creates a polarization selective diffraction pattern 500 for imparting a polarization selective lensing function, in accordance with an embodiment of the disclosure. FIG. 5B is an expanded view of a portion of FIG. 5A.

Diffraction pattern 500 may be created by designing a pattern into the structure of WGP 400 illustrated in FIGS. 4A and 4B. By designing a diffraction pattern into the structure of WGP 400, the polarization that is reflected (illustrated as P1 in FIGS. 4A and 4B) will become partially reflected and partially transmitted. The transmitted potion is diffracted according to the diffraction pattern. The structure of WGP 400 can be rotated to select which linear polarization is diffracted and which linear polarization is transmitted substantially unaffected.

FIG. 5A illustrates a binary amplitude diffractive lens that is patterned into a Fresnel zone diffraction pattern 500 with concentric zones 505. The Fresnel zone diffraction pattern 500 may be characterized as follows, $$f^2 + r_n^2 = \left(f^2 + \frac{n\lambda}{2}\right)^2,$$

$$r_n^2 = n\lambda f + \frac{n^2\lambda^2}{4},$$

where n is an integer representing each concentric zone 505, f represents the focal length of the diffractive lens, λ represents the wavelength of the light to diffract, and $r_n$ represents the radius of zone n. The optical power P of the diffractive lens is $$-\frac{1}{f}.$$

While FIGS. 5A and 5B illustrate a Fresnel zone diffraction pattern 500 for implementing a diverging lens function, it should be appreciated that WGP 400 may be patterned with a variety of other types of diffraction patterns to form a variety of other types of binary amplitude diffraction lenses having other lens functions.

Figure 6:
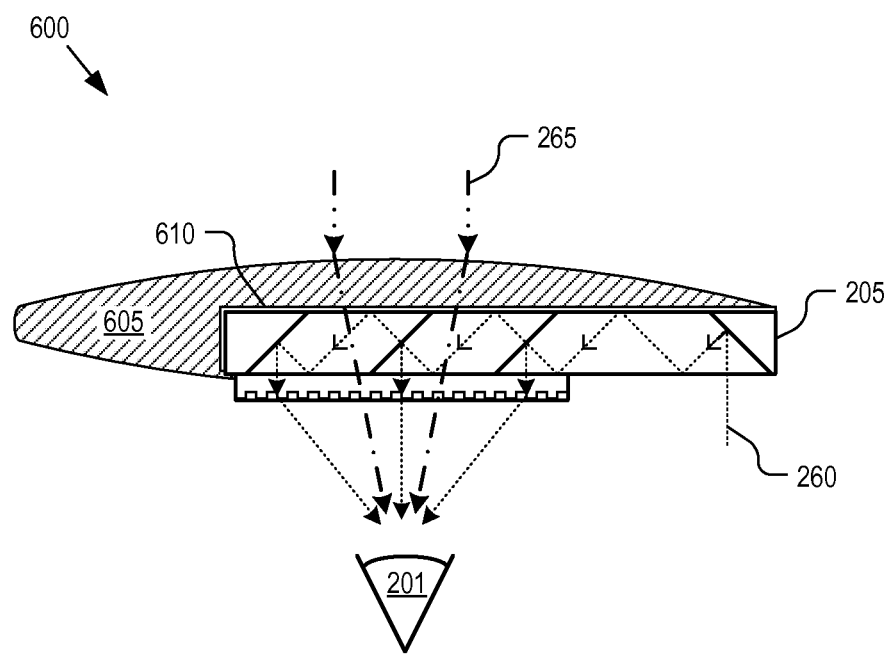
FIG. 6 illustrates how the eyepiece can be configured to embed the waveguide within a lens, in accordance with an embodiment of the disclosure.

FIG. 6 illustrates how an eyepiece 600 can be configured to embed waveguide 205 within a lens, in accordance with an embodiment of the disclosure. Eyepiece 600 is similar to eyepiece 200, except that waveguide 205 is partially (or entirely) embedded within polarizing lens 605. However, in the illustrated embodiment, to preserve the TIR light guiding properties of waveguide 205, a gap or filler layer 610 of material having a lower index of refraction than waveguide 205 is disposed between waveguide 205 and polarizing lens 605.

Figure 7:
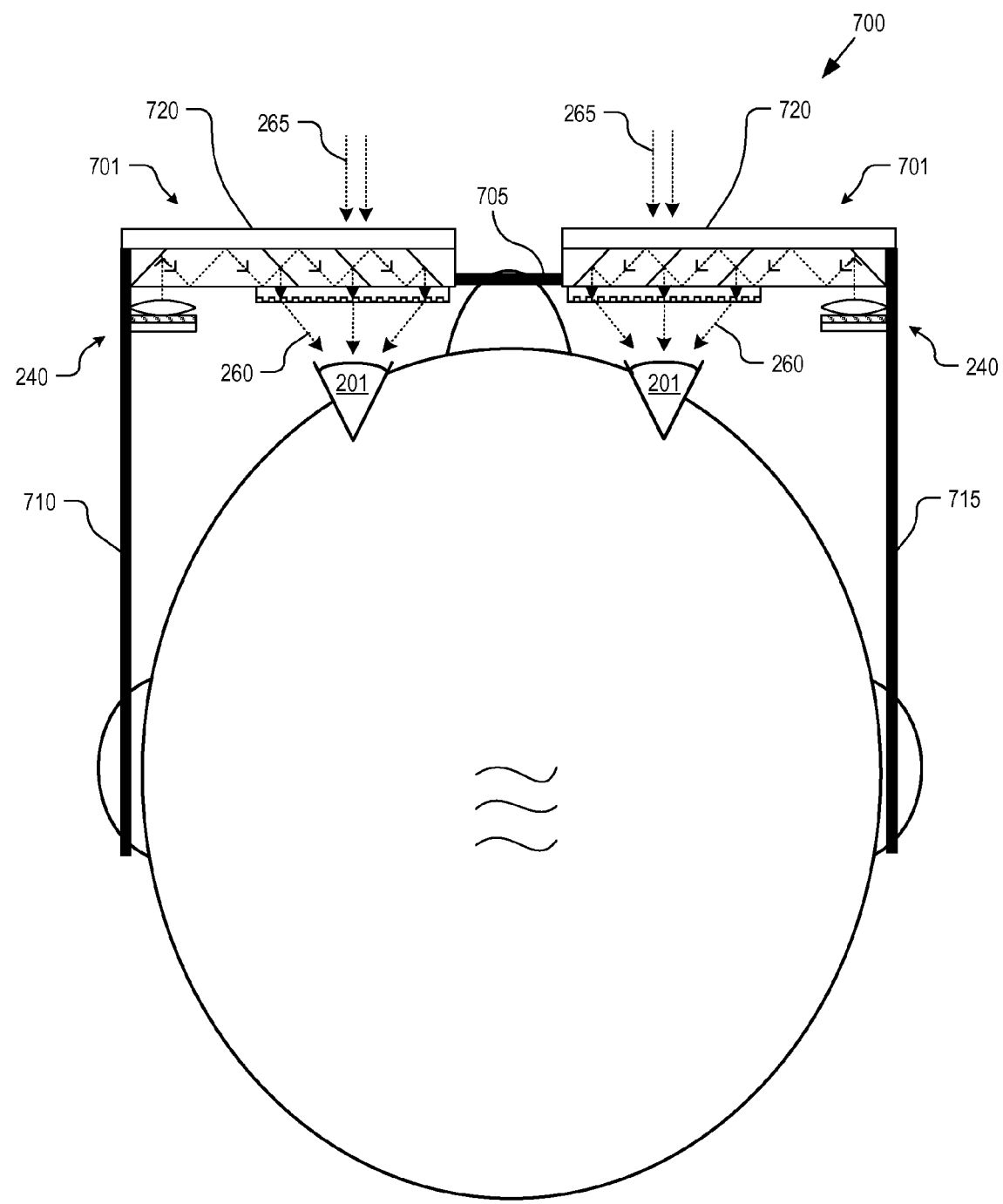
FIG. 7 is a top view of a HMD implemented with two eyepieces with integrated diffraction lenses, in accordance with an embodiment of the disclosure.

FIG. 7 is a top view of an HMD 700 using a pair of eyepieces 701, in accordance with an embodiment of the disclosure. Each eyepiece 701 may be implemented with embodiments of either eyepiece 200 or 600, or combinations/variations thereof. The eyepieces 701 are mounted to a frame assembly, which includes a nose bridge 705, left ear arm 710, and right ear arm 715. In the illustrated embodiment, each eyepiece 701 includes a polarizing lens 720, which may be a prescription lens or a lens blank. Although FIG. 7 illustrates a binocular embodiment, HMD 700 may also be implemented as a monocular HMD with just a single eyepiece 701.

The two eyepieces 701 are secured into an eye glass arrangement that can be worn on the head of a user. The left and right ear arms 710 and 715 rest over the user's ears while nose assembly 705 rests over the user's nose. The frame assembly is shaped and sized to position a viewing region 225 in front of a corresponding eye 201 of the user. Of course, other frame assemblies having other shapes may be used (e.g., a visor with ear arms and a nose bridge support, a single contiguous headset member, a headband, or goggles type eyewear, etc.).

The illustrated embodiment of HMD 700 is capable of displaying an augmented reality to the user. The viewing region of each eyepiece permits the user to see a real world image via external scene light 265. Left and right (binocular embodiment) CGI light 260 may be generated by one or two CGI engines (not illustrated) coupled to a respective display source 240. CGI light 260 is seen by the user as virtual images superimposed over the real world as an augmented reality.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a head mounted display, comprising:
   a waveguide including:
      an eye-ward side and an ambient side between which polarized image light of a first polarization is guided; and
      a viewing region for directing the polarized image light out of the waveguide through the eye-ward side, wherein the viewing region of the waveguide passes ambient light incident on the ambient side through to the eye-ward side;
   an ambient light polarizer disposed adjacent to the ambient side along the viewing region of the waveguide to polarize the ambient light into polarized ambient light having a second polarization orthogonal to the first polarization; and
   a wire grid polarizer disposed adjacent to the eye-ward side along the viewing region of the waveguide, the wire grid polarizer including a diffraction lens having a lens function patterned into the wire grid polarizer, wherein the wire grid polarizer is oriented to pass the polarized ambient light substantially unaffected by the lens function while applying the lens function to the polarized image light via diffraction.

2. The apparatus of claim 1, wherein the diffraction lens comprises a binary amplitude diffractive lens.

3. The apparatus of claim 2, wherein the binary amplitude diffractive lens comprises a Fresnel zone plate.

4. The apparatus of claim 2, wherein the binary amplitude diffractive lens comprises a diverging lens to correct for near-sightedness.

5. The apparatus of claim 1, wherein the wire grid polarizer is disposed on the eye-ward side of the waveguide.

6. The apparatus of claim 1, wherein wires of the wire grid polarizer are oriented to effect diffractive lensing along the first polarization while substantially not causing diffractive lensing along the second polarization.

7. The apparatus of claim 1, wherein the ambient light polarizer comprises a prescription lens with optical power.

8. The apparatus of claim 1, wherein the ambient light polarizer comprise a blank lens without optical power.

9. The apparatus of claim 1, wherein the eye-ward and ambient sides of the waveguide are substantially parallel to each other and wherein the viewing region comprises a plurality of partially reflective surfaces obliquely oriented to the eye-ward and ambient sides.

10. The apparatus of claim 9, wherein the waveguide further comprises an in-coupling region to couple the polarized image light into the waveguide from a display source.

11. The apparatus of claim 10, wherein the display source is optically coupled to the in-coupling region to provide the polarized image light as a substantially collimated image.

12. The apparatus of claim 10, wherein the in-coupling region comprises one of an oblique reflective surface disposed between the eye-ward and ambient sides, a prism molded into the waveguide, or an element disposed along the eye-ward side to permit the polarized image light to enter into the waveguide.

13. The apparatus of claim 11, wherein the display source comprises:
    a display panel;
    an image polarizer; and
    a collimating lens.

14. The apparatus of claim 11, wherein the display source comprises one or more laser diodes.

15. The apparatus of claim 1, wherein the waveguide is embedded within a recess or a cavity of the ambient light polarizer.

16. The apparatus of claim 1, wherein the ambient light polarizer is formed onto the ambient side of the waveguide.

17. A head mounted display ("HMD"), comprising:
    a display source to generate polarized image light of a first polarization;
    an eyepiece including:
        a waveguide including an eye-ward side and an ambient side between which the polarized image light is guided from the display source to a viewing region for directing the polarized image light out of the waveguide through the eye-ward side, wherein the viewing region of the waveguide passes ambient light incident on the ambient side through to the eye-ward side;
        an ambient light polarizer disposed adjacent to the ambient side along the viewing region of the waveguide to polarize the ambient light into polarized ambient light having a second polarization orthogonal to the first polarization; and
        a wire grid polarizer disposed adjacent to the eye-ward side along the viewing region of the waveguide, the wire grid polarizer including a diffraction lens having a lens function patterned into the wire grid polarizer, wherein the wire grid polarizer is oriented to applying the lens function to the polarized image light via diffraction; and
    a frame assembly to support the eyepiece and display source for wearing on a head of a user.

18. The HMD of claim 17, wherein the diffraction lens comprises a binary amplitude diffractive lens.

19. The HMD of claim 18, wherein the binary amplitude diffractive lens comprises a Fresnel zone plate.

20. The HMD of claim 18, wherein the binary amplitude diffractive lens comprises a diverging lens to correct for near-sightedness.

21. The HMD of claim 17, wherein wires of the wire grid polarizer are oriented to effect diffractive lensing along the first polarization while substantially not causing diffractive lensing along the second polarization.

22. The HMD of claim 17, wherein the eye-ward and ambient sides of the waveguide are substantially parallel to each other and wherein the viewing region comprises a plurality of partially reflective surfaces obliquely oriented to the eye-ward and ambient sides.

23. A method of operation of a head mounted display, the method comprising:
    guiding polarized image light having a first polarization along between an ambient side and an eye-ward side within a waveguide;
    directing the polarized image light through a wire grid polarizer disposed adjacent to the eye-ward side of the waveguide, the wire grid polarizer including a diffraction lens patterned into the wire grid polarizer;
    lensing the polarized image light with the diffraction lens; and
    passing ambient light having a second polarization orthogonal to the first polarization, incident through the ambient and eye-ward side of the waveguide, through the diffraction lens patterned into the wire grid polarizer substantially without diffractive lensing.

24. The method of claim 23, wherein the diffraction lens comprises a binary amplitude diffractive lens.

25. The method of claim 24, wherein the binary amplitude diffractive lens comprises a Fresnel zone plate.

26. The method of claim 24, wherein the binary amplitude diffractive lens comprises a diverging lens to correct for near-sightedness.

27. The method of claim 23, wherein wires of the wire grid polarizer are oriented to effect diffractive lensing along the first polarization while substantially not causing diffractive lensing along the second polarization.

28. The method of claim 23, further comprising:
    emitting the polarized image light from the waveguide through the eye-ward side of the waveguide via reflection of the polarized image light from a plurality of partially reflective surfaces disposed within the waveguide and positioned along a viewing region of the waveguide and obliquely oriented to the eye-ward and ambient sides, wherein the eye-ward and ambient sides are substantially parallel sides.

* * * * *